United States Patent
Babu et al.

(10) Patent No.: US 11,507,632 B2
(45) Date of Patent: Nov. 22, 2022

(54) SYSTEM AND METHOD TO INITIATE INDUCIVE SEARCH ACROSS MULTIPLE PRODUCTS USING EMBEDDED HELP FILES WITHIN A TRUSTED DOMAIN

(71) Applicant: Dell Products L.P., Round Rock, TX (US)

(72) Inventors: Rathi Babu, Bangalore (IN); Mainak Roy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 16/900,493

(22) Filed: Jun. 12, 2020

(65) Prior Publication Data

US 2021/0390147 A1 Dec. 16, 2021

(51) Int. Cl.
*G06F 16/953* (2019.01)
*G06F 21/62* (2013.01)

(52) U.S. Cl.
CPC ........ *G06F 16/953* (2019.01); *G06F 21/6218* (2013.01); *G06F 2221/2149* (2013.01)

(58) Field of Classification Search
CPC .................................................... G06F 16/953
See application file for complete search history.

(56) References Cited

U.S. PATENT DOCUMENTS

2020/0142989 A1 * 5/2020 Bordawekar ............ G06N 5/04

* cited by examiner

*Primary Examiner* — Baoquoc N To
(74) *Attorney, Agent, or Firm* — Terrile, Cannatti & Chambers, LLP; Emmanuel A. Rivera (57) ABSTRACT

A system, method, and computer-readable medium are disclosed for performing inducive searches across multiple products within a trusted domain. Products and/or services in the trusted domain are identified. Contextual information associated with the products and/or services is collected. Interrelationships and interoperations between the products and/or services is determined. An inducive search query as to a particular product and/or service is service. Contextual information is returned as to particular product and/or service and related products and/or services.

13 Claims, 7 Drawing Sheets

SYSTEM AND METHOD TO INITIATE INDUCIVE SEARCH ACROSS MULTIPLE PRODUCTS USING EMBEDDED HELP FILES WITHIN A TRUSTED DOMAIN

BACKGROUND OF THE INVENTION

Field of the Invention

The present invention relates to the management of information handling systems. More specifically, embodiments of the invention provide a system, method, and computer-readable medium for performing inducive searches across multiple products within a trusted domain.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional search engines and search approaches are typically driven by related key words or key phrases and not driven by action or technology. A search may be based on a product being used by a searcher. The user may not have an understanding as to the context in how the product is utilized with other associated products to accomplish certain tasks.

There can be multiple associated products in an environment, where each product has its own help files or embedded support material. Current information technology (IT) infrastructures may be limited as to how to exchange information between different source files or online help files which are embedded in different products to find out contextual information or data.

Entities such as governments, military, financial institutions, universities, and other organizations with security concerns may implement a trusted boundary where access of users is restricted as to the sources within the trusted boundary. The sources can be on the Internet. When a search for information is performed within only sources within the trusted boundary, without communication to other sources, searching becomes limited. In such cases, the use of key word and key phrase search techniques is limited, and a more interactive search approach that is action or technology based is desirable.

SUMMARY OF THE INVENTION

A system, method, and computer-readable medium are disclosed for performing inducive searches across multiple products within a trusted domain. Products and/or services in the trusted domain are identified. Contextual information associated with the products and/or services is collected. Interrelationships and interoperations between the products and/or services are determined. An inducive search query as to a particular product and/or service is service. Contextual information is returned as to particular product and/or service and related products and/or services.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing an inducive search across multiple products within a trusted domain or boundary. The inducive search is performed within the trusted domain or boundary and is able to understand context of products used in different use scenarios. Interrelated, and inter-operational products are determined. Potential threats are identified due to particular scenarios. Relevant information is collected from different products and services that are within the trusted boundary.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
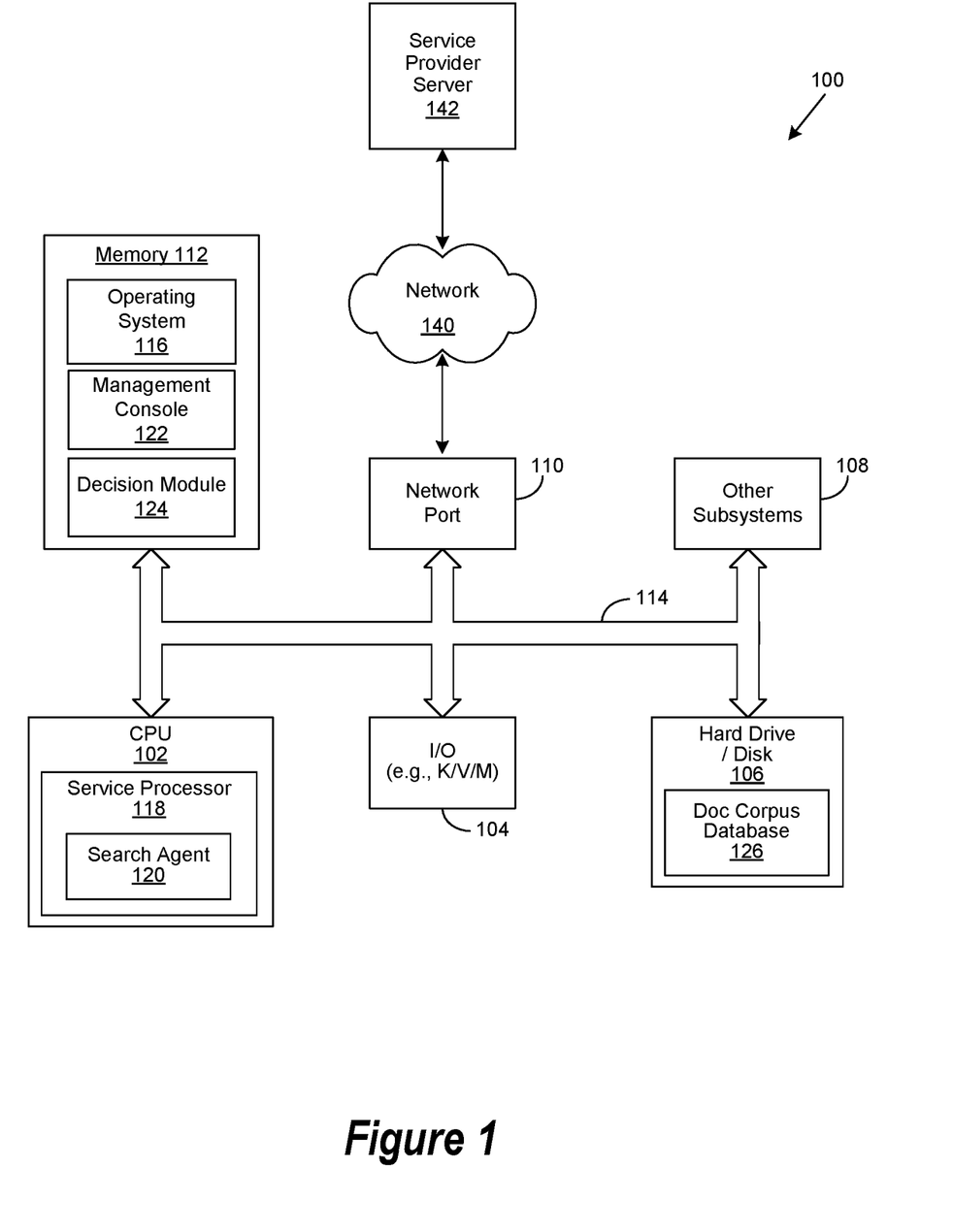
FIG. 1 is a general illustration of components of an information handling system as implemented in the system and method of the present invention.

FIG. 1 is a generalized illustration of an information handling system that can be used to implement the system and method of the present invention. The information handling system 100 includes processors (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes operating system (OS) 116. Certain embodiments provide for the information handling system 100 to be implemented as a server computer, computing device, stand-alone workstation, etc.

In various embodiments, the processors 102 incudes a service processor 118 which includes an inducive search agent 120. Certain embodiments, the system memory 112 includes a management console 122 and decision module 124. Furthermore, hard drive or disk storage 106 can includes a document (doc) corpus database 126. The service processor 118, inducive search agent 120, management console 122, decision module 126, and doc corpus database 126 are further described herein. It is to be understood that certain implementations provide for the service processor 118, inducive search agent 120, and doc corpus database 126 to be included in system memory 112. Certain implementations provide for the management console 122 and decision module 124 to be part of service processor 118. It is to be understood that the described components/elements can be configured in software, hardware, firmware, and/or a combination of such.

In certain embodiments, the information handling system 100 is able to download the service processor 118, inducive search agent 120, management console 122, decision module and doc corpus database 126 from the service provider server 142. In another embodiment, the service processor 118, inducive search agent 120, management console 122, decision module 124, and doc corpus database 126 are provided as a service from the service provider server 142.

Figure 2:
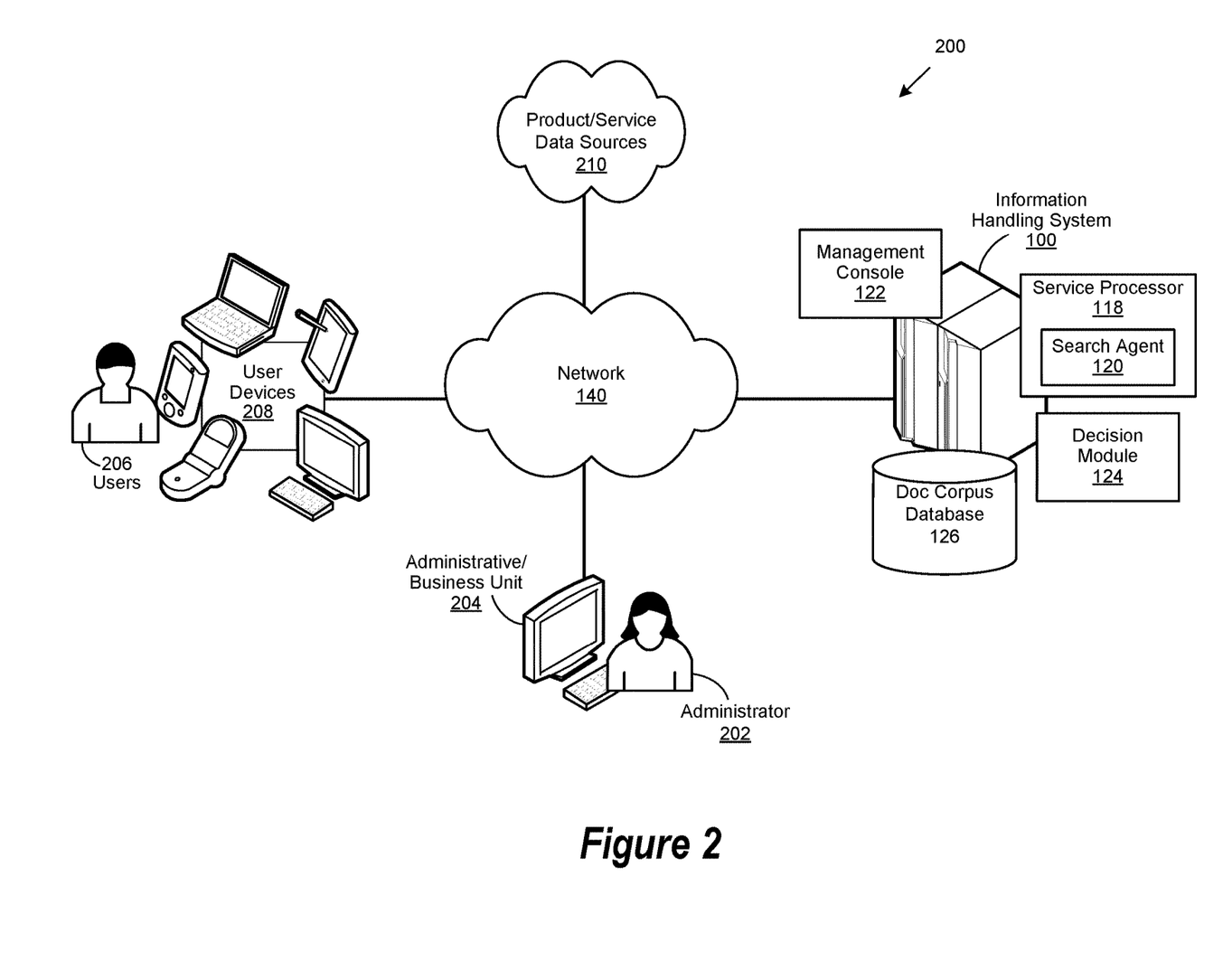
FIG. 2 is a simplified block diagram of a system for inducive searches across multiple products within a trusted domain or boundary.

FIG. 2 is a simplified block diagram of a system for inducive searches across multiple products within a trusted domain or boundary. The system 200 includes the information handling system 100. Certain implementations provide for the system 200 to be part of an ecosystem such as data center, where the ecosystem is part of a trusted boundary. Such an ecosystem can include multiple interconnected information handling systems 100, and the inducive search queries performed users as described herein are shared within the ecosystem of the trusted domain or boundary.

As described in FIG. 1, the information handling system 100 includes the service processor 118 which includes the inducive search agent 120. Information handling system 100 further includes a management console 122, decision module 124, and doc corpus database 126.

Administrator(s) 202 through business/administrative system(s) 204 interact with the information handling system 100. The business/administrative system(s) 204 and information handling system 100 are connected through network 140. The network 140 can provide for and be part of the trusted domain or boundary that interconnects the business/administrative system(s) 204, the information handling system 100, trusted users 206 and user devices 208. A user device 208 can refer to an information handling system such as a personal computer, a laptop computer, a tablet computer, a personal digital assistant (PDA), a smart phone, a mobile telephone, or other device that is capable of communicating and processing data.

The service processor 118 allows the administrator(s) 202 to update and manage information handling system 100, even when the information handling system 100 is turned off. The service processor 118 can also provide a web interface and command line interface that allows administrator(s) 202 to perform remote management tasks.

Products and services, such as hardware, firmware, and software components operate in the system 200. Such products and services can be interrelated to one another and perform particular tasks and operations. The products and services have contextual information or data that describes such tasks and information. For example, the contextual information or data can be in the form of embedded guides, white papers, embedded videos, knowledge based articles, help files, etc. In certain implementations, contextual information or data is downloaded or fetched from various external sources, such as product/services sources 210. The downloaded contextual information or data is specific to products and/or services operating in system 200. In certain implementations, the downloaded contextual information or data is stored in doc corpus 126. In certain implementations, the service processor 118 provides for a dynamic database by including in doc corpus 126, the contextual information or data (i.e., embedded guides, white papers, embedded videos, knowledge based articles, help files, etc.). The contextual information or data being part of different products or services of the system 200.

Inducive searching is performed by trusted users 206 through management console 122. When performing the inducive searching, the inducive search agent 120 running in service processor 118 gathers related document/information corpus or the contextual information or data for the search. Before a response (answer) is provided to the trusted user 206, context is analyzed as to actual problems (user "pain point") or inquiries that are being made and the associated technology (i.e., products and services).

As an example, if a search is performed with only key word or key phrases for a product or service in trusted domain or boundary of system 200, for "Setup Windows® 2019 installation", search results may return as to details of a "Window® 2019" installation; however, what is really desired is to get search results with information by understanding action of trusted user 206, and the phase of installation of the action of trusted user 206. With the inducive searching methods described herein, the search results can include contextual information or data regarding setting up "Window® 2019" in an actual environment. For examples, search query results that return contextual information or data can include "Setup Windows® 2019 for PowerEdge™ 940"; "Setup Windows 2019 using iDRAC9™", "Setup Windows® 2019 using Ansible® Module," etc. Responses to the search query are based on an action taken by trusted user 206, products and/or services in use, and taken in context as to the technology related to the action taken by trusted user 206.

The responses are technology driven based on the action taken by the trusted user and the products are in use, ensuring that we are supporting the use context. For example, at any given point of time, multiple hardware components may operate simultaneously with the several other software applications, and other services to accomplish any particular task. The service processor 118 and the inducive search agent 120 are configured to understand the context in which hardware components, software applications, and other services are used for particular tasks at any given point in time.

The management console 122 is an interactive search console that supports the inducive searching of trusted users 206 within the trusted domain or boundary of system 200. Once a trusted user 206 initiates a particular search, the product or service under consideration is checked for use at particular instances. The contextual information or data is retrieved by service processor 118/inducive search agent 120 driven activities. When the product or service is identified, the doc corpus database 126 is looked at and populated with a list of contextual information or data from the product/service data sources 210 related to the product or service. Decision module 124 can be configured to map a product search string with content with the guidance of service processor 118.

The contextual information or data related to the product or service is retrieved by service processor 118/inducive search agent 120 from doc corpus database 126. If additional details as to interrelated or interdependent products or services, the same contextual data or information is retrieved from different source files in doc corpus database 126. The inducive search agent 120 is configured to understand the technology driven context and identify the right content while producing the correlated information, and not dependent only on the key word and key phrase search strings.

A query results list can be prioritized by the product which is in use along with the key word and key phrases used in the search console query. An accurate and prioritized list is generated and provided to trusted user 206.

Certain implementations provide open communication channels between the service processor 118/inducive search agent 120 and user devices 208 and product/service data sources to collect log files related to actions of products and services, and understand what products and services are involved at any given point in time in the action. Such log files can be stored by service processor 118 into the doc corpus database 126. When a user 206 performs a search and looks for information, the inducive search agent 120 searches for actuals from the log files and provides for a list of products or services involved at a given point of time in an action.

The accessible log files provide information as to critical information or data, such as warning messages, blocking error codes, interruptions that occurred due to version mismatch, etc. For example, such detailed information provides context and situation as to where a failure occurred, and which products and/or services were involved at that given point of time.

Figure 3:
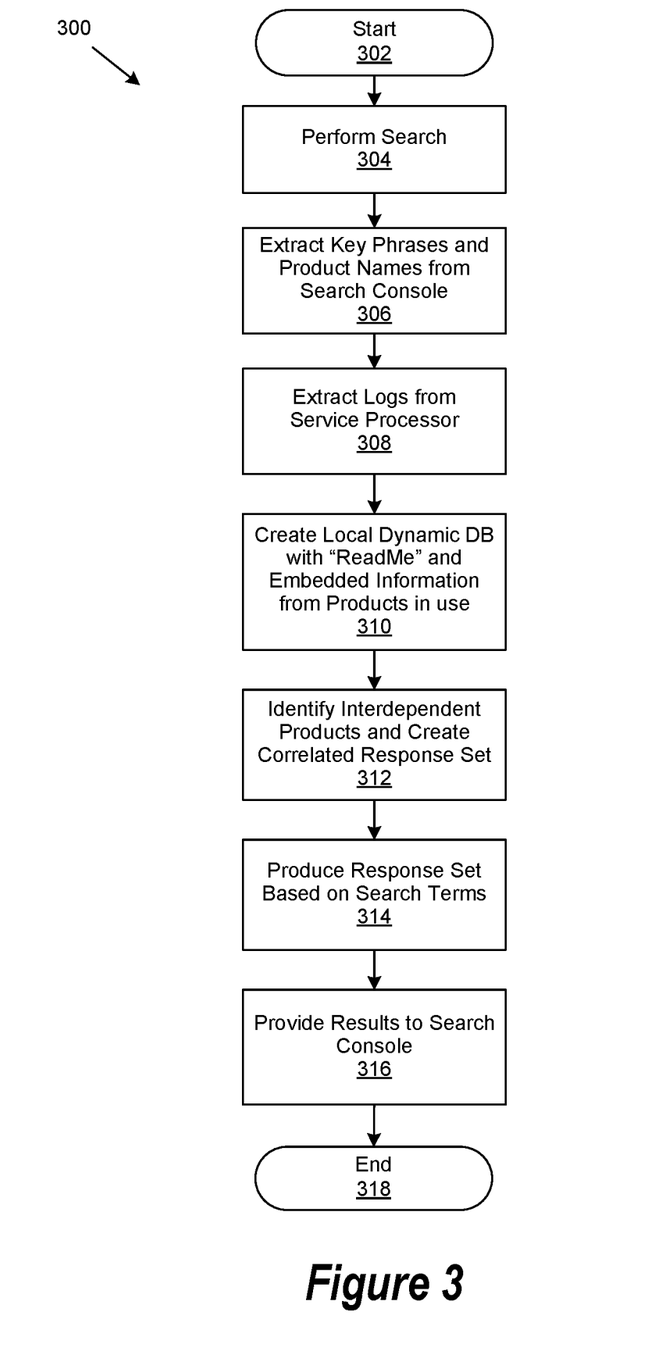
FIG. 3 is a generalized flowchart for an inducive search workflow.

FIG. 3 is a generalized flowchart for an inducive search workflow. The order in which the method is described is not intended to be construed as a limitation, and any number of the described method blocks may be combined in an y order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 begins. At step 304, a trusted user 206 initiates a search query performed on management console 122. The search query can include key words and/or key phrases and include a particular product or service. The product or service can be hardware, firmware, or software component that is used in the trusted domain or boundary of system 200.

At step 306, the key words and key phrases, along with the names of the product or service are extracted or identified at the search or management console 122.

At step 308, log files are extracted from the service processor 118. The log files are related to actions of products and services and can be from previous trusted user 206 search queries.

At step 310, the service processer 118 creates a local and dynamic database with contextual information or data, such as "read me" and "embedded data or information as to products and services used at any given time in an action.

At step 312, interdependent or interrelated products and services are identified, and a correlated response set is created. In certain implementations, the identifying and creating can be performed by the inducive search agent 120.

At step 314, a response is set is produced based on the search terms such as key words and key phrases, along with the correlated response set. At step 316, search results are provided to the management console 122 and the trusted user 206 requesting the search. At step 318, the process 300 ends.

Figure 4:
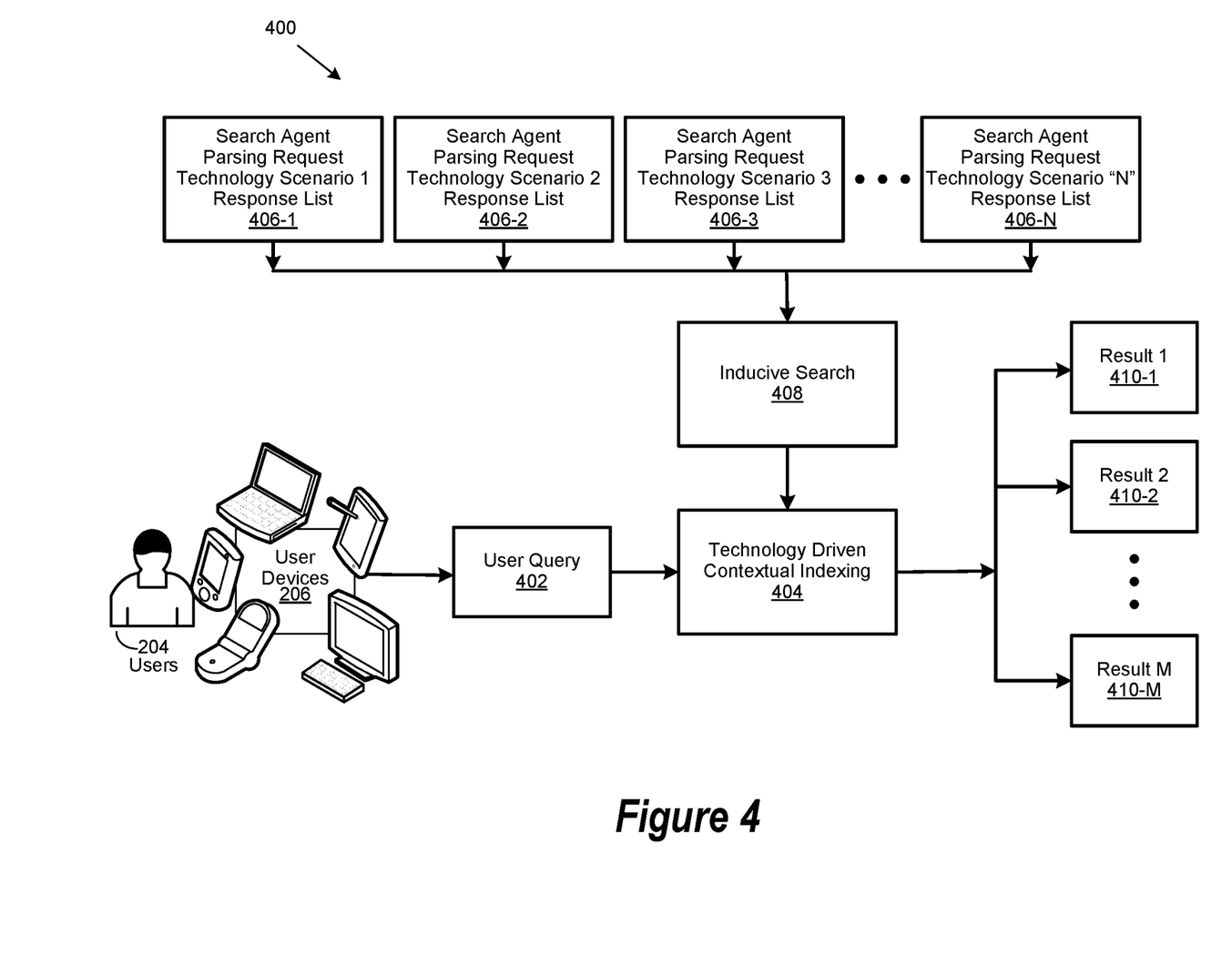
FIG. 4 is a simplified block diagram of an architecture for inducive searches across multiple products within a trusted domain or boundary.

FIG. 4 is a simplified block diagram of an architecture for inducive searches across multiple products within a trusted domain or boundary. The architecture 400 provides for trusted users 204 to perform a key word and/or key phrase search at user query 402. The search query is received at technology driven contextual indexing 404, which is performed by the service processor and doc corpus database 126. Inducive search agent 120 performs parsing requests as to technology related scenarios involving interrelated or interdependent products and services and provides a response list as represented by boxes 406-1, 406-2, 406-3 to 406-N. The respective response lists are received at the inducive search box 408. Search results 410-1, 410-2, through 410-M with contextual information or data as to actions performed by interrelated or interdependent products and services are provided by block 404.

Figure 5:
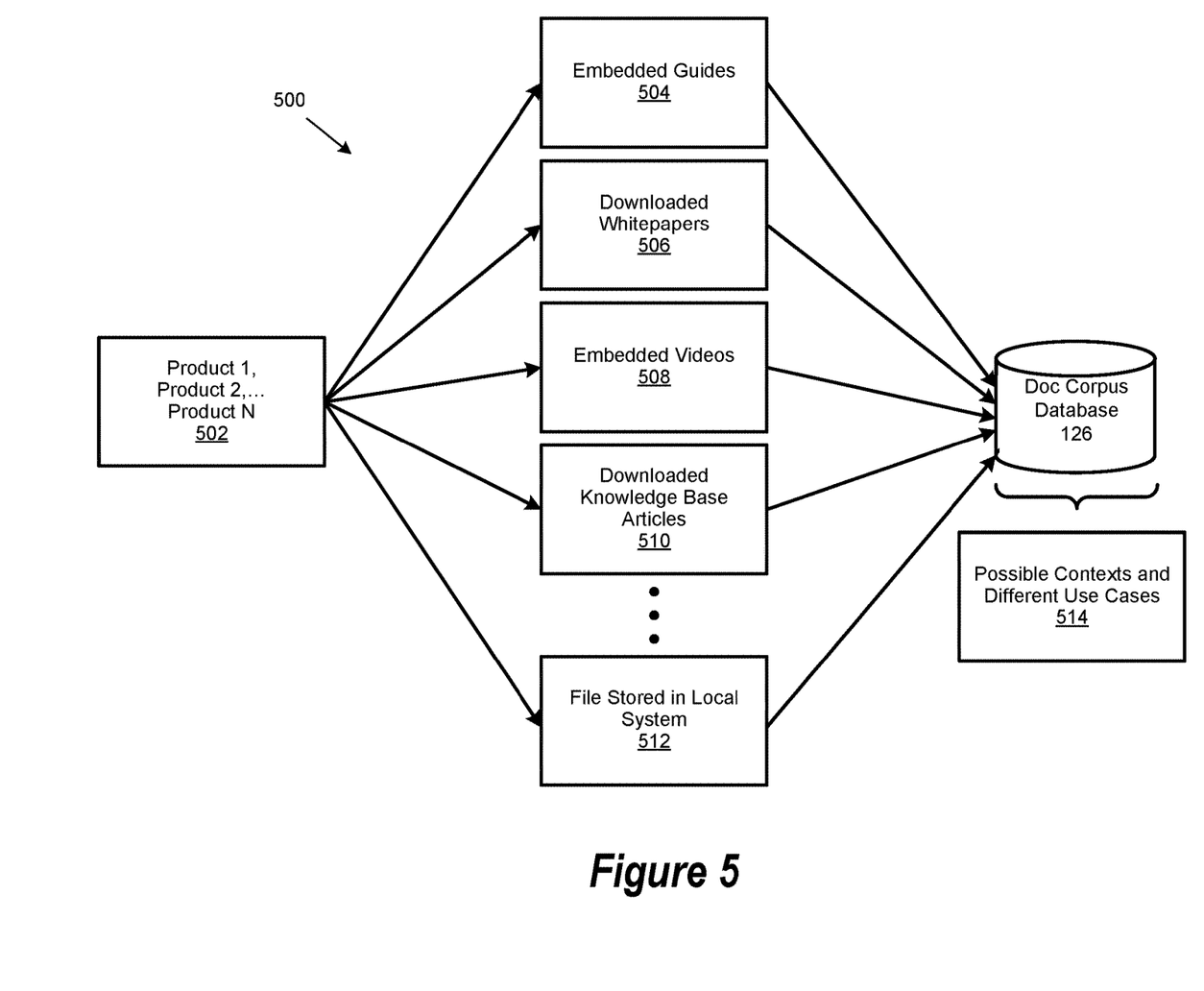
FIG. 5 is a simplified block diagram of generating a local repository within a trusted domain or boundary.

FIG. 5 is a simplified block diagram of generating a local repository within a trusted domain or boundary. The block diagram 500 identifies various products and services in 502. The products and services, such as hardware, firmware, and software components operate in the system 200. Such products and services can be interrelated or interdependent to one another and perform particular tasks and operations. The products and services have contextual information or data that describes such tasks and information.

The contextual information or data can include for example, embedded guides 504, downloaded white papers 506, embedded videos 508, downloaded knowledge based articles 510, and locally stored files (e.g., help files) 512. The contextual information or data can be received from various sources, such as product/services sources 210 described in FIG. 2. The contextual information or data is stored locally in doc corpus database 126. Possible contexts and use cases 514 can be extracted from the doc corpus database 126.

Figure 6:
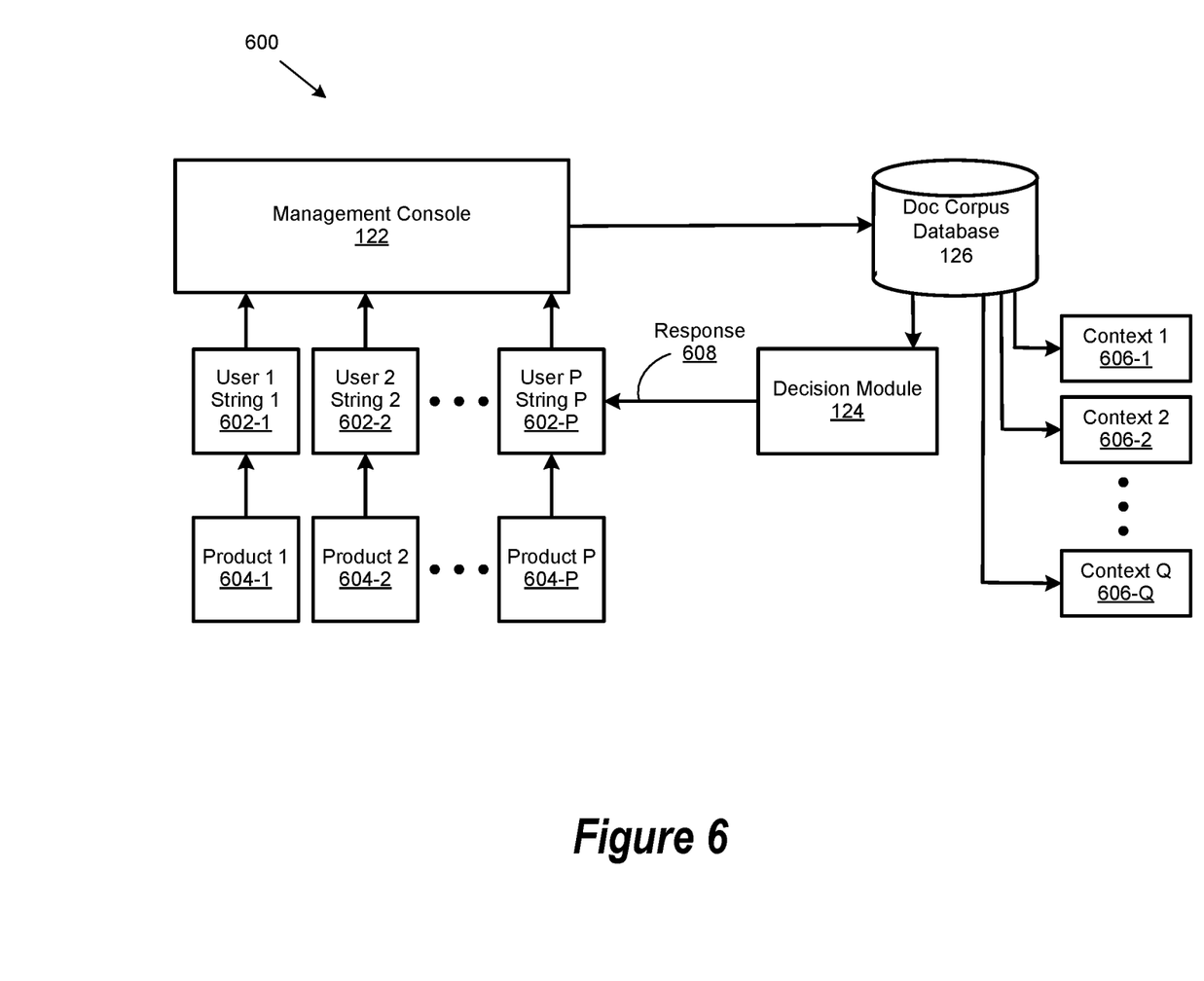
FIG. 6 is a simplified block diagram of context mapping and decision making in inducive searches across multiple products within a trusted domain or boundary.

FIG. 6 shows a simplified block diagram of context mapping and decision making in inducive searches across multiple products within a trusted domain or boundary. The block diagram 600 includes the management console 122, which is implemented as a search console for user and search strings represented as 602-1, 602-2 to 602-P. Each user and search string 602 is related to a respective product or service 604, as represented by product 1 604-1, product 2 604-2 to product P 602-P. In certain instances, products 604 may be the same or different product or service.

The doc corpus database 126 provides segregated relevant content based on a search query. Contextual information or data as described herein, is represented by context 1 606-1, context 2 602-2 to context Q 602-Q. A response 608 is provided by the decision module 124 which maps, along with the guidance of the service processor 118, the product search string in blocks 602 with content along with the guidance of the service processor 118.

Figure 7:
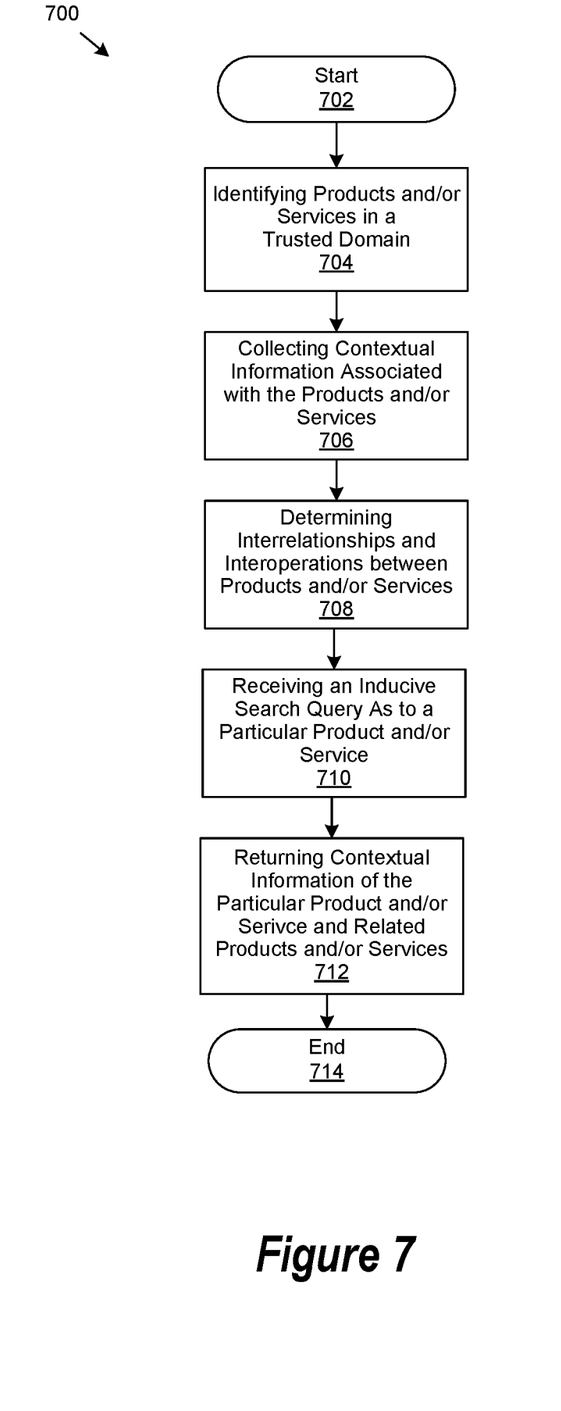
FIG. 7 is a generalized flowchart for performing inducive searches across multiple products within a trusted domain.

FIG. 7 is a generalized flowchart for performing inducive searches across multiple products within a trusted domain. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 702, the process 700 begins. At step 704, products and/or services in a trusted domain are identified. At step 706, contextual information associated with the products and/or services are collected. At step 708, interrelationships and interoperations between the products and/or services are determined. At step 710, an inducive search query is received as to a particular product and/or service. At step 712, contextual information as to the particular product and/or service and related products and/or services is returned. At step 714, the process 700 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations to perform inducive searches across multiple products within a trusted domain and comprising instructions executable by the processor and configured for:
   identifying products and/or services in the trusted domain are identified;
   collecting contextual information associated with the products and/or services;
   determining interrelationships and interoperations between the products and/or services;
   receiving an inducive search query as to a particular product and/or service;
   returning contextual information as to the particular product and/or service and related products and/or services.

2. The system of claim 1, wherein the trusted domain is a datacenter and the products and/or services are hardware, firmware, and software components operating in the datacenter.

3. The system of claim 1, wherein collected contextual information is downloaded from sources external to the trusted domain and stored in a local database in the trusted domain.

4. The system of claim 1, wherein the interrelationships and interoperations are related to tasks performed by the products and/or services.

5. The system of claim 1, wherein the determining the interrelationships and interoperations comprise parsing the inducive search query as to technology related scenarios.

6. The system of claim 1 further comprising extracting use cases from the local database.

7. The system of claim 1 further comprising creating log files of search queries related to tasks performed by the products and/or services.

8. A non-transitory, computer-readable storage medium embodying computer program code, the computer program code comprising computer executable instructions configured for:
   identifying products and/or services in the trusted domain are identified;
   collecting contextual information associated with the products and/or services;
   determining interrelationships and interoperations between the products and/or services;
   receiving an inducive search query as to a particular product and/or service;
   returning contextual information as to the particular product and/or service and related products and/or services.

9. The non-transitory, computer-readable storage medium of claim 8, wherein the trusted domain is a datacenter and the products and/or services are hardware, firmware, and software components operating in the datacenter.

10. The non-transitory, computer-readable storage medium of claim 8, wherein collected contextual information is downloaded from sources external to the trusted domain and stored in a local database in the trusted domain.

11. The non-transitory, computer-readable storage medium of claim 8, wherein the interrelationships and interoperations are related to tasks performed by the products and/or services.

12. The non-transitory, computer-readable storage medium of claim 8, wherein the determining the interrelationships and interoperations comprise parsing the inducive search query as to technology related scenarios.

13. The non-transitory, computer-readable storage medium of claim 8 further comprising extracting use cases from the local database.

* * * * *